United States Patent
Pahlow

[11] 3,904,159
[45] Sept. 9, 1975

[54] ADJUSTABLE SUPPORTING STRUCTURE FOR POWER TOOLS OR THE LIKE

[75] Inventor: Lothar Pahlow, Geesthacht, Germany

[73] Assignee: Wilhelmsburger Maschinenfabrik Hinrichs & Sohn, Geesthracht, Germany

[22] Filed: Dec. 6, 1974

[21] Appl. No.: 530,342

[30] Foreign Application Priority Data
May 9, 1974  Germany........................... 2422392

[52] U.S. Cl. ............................... 248/23; 408/173
[51] Int. Cl.² ............................................ E21C 5/00
[58] Field of Search ........... 248/23, 16, 206 A, 178, 248/285; 173/32, 33; 408/173, 76

[56] References Cited
UNITED STATES PATENTS

| | | | |
|---|---|---|---|
| 3,144,792 | 8/1964 | Marchis ............................. | 408/181 |
| 3,351,143 | 11/1967 | Seibold et al. .................... | 173/32 X |
| 3,456,738 | 7/1969 | Harry................................ | 173/32 X |
| 3,485,306 | 12/1969 | Gulley.............................. | 173/32 |
| 3,704,958 | 12/1972 | Gulibon .......................... | 408/181 X |
| 3,784,315 | 1/1974 | O'Brien........................... | 173/32 X |
| 3,791,755 | 2/1974 | Warren............................ | 408/76 |

*Primary Examiner*—J. Franklin Foss
*Attorney, Agent, or Firm*—Michael S. Striker

[57] ABSTRACT

An adjustable supporting structure for a power tool has a foot provided with electromagnets so that it may be held on a body of magnetizable material. The base of a supporting column adapted to support a power tool is arranged opposite and closely adjacent to an end face of the foot. A clamping ring having two substantially semicircular sections is arranged about a cylindrical extension of the base and about a cylindrical portion of the foot adjacent the end face and inwardly extending flanges on the sections of the clamping ring respectively engage in annular grooves provided in the foot and the extension of the base. The sections of the clamping ring are coupled to the base for rotation therewith so that when the clamping action of the ring is relaxed, the column and the clamping ring may be turned relative to the foot to thereby adjust the angular position of a power tool carried by the column with respect to a workpiece. The radial depth of the groove in the base is such to provide radial clearance for the flanges engaged therein so that the column may be shifted laterally with respect to the foot to thereby adjust the lateral position of the power tool with regard to a workpiece. Such lateral shifting of the column may be performed by a screw spindle turnably and axially immovably mounted in one of the sections of the clamping rings and having a threaded end portion engaged in a threaded bore in the base. The sections of the clamping ring and the base are arranged with respect to each other in such a manner so that when the sections are clamped to prevent rotation of the column relative to the foot, the column is still movable laterally with respect to the foot, whereby undesired rotary motion of the column during lateral adjustment thereof is prevented.

10 Claims, 3 Drawing Figures

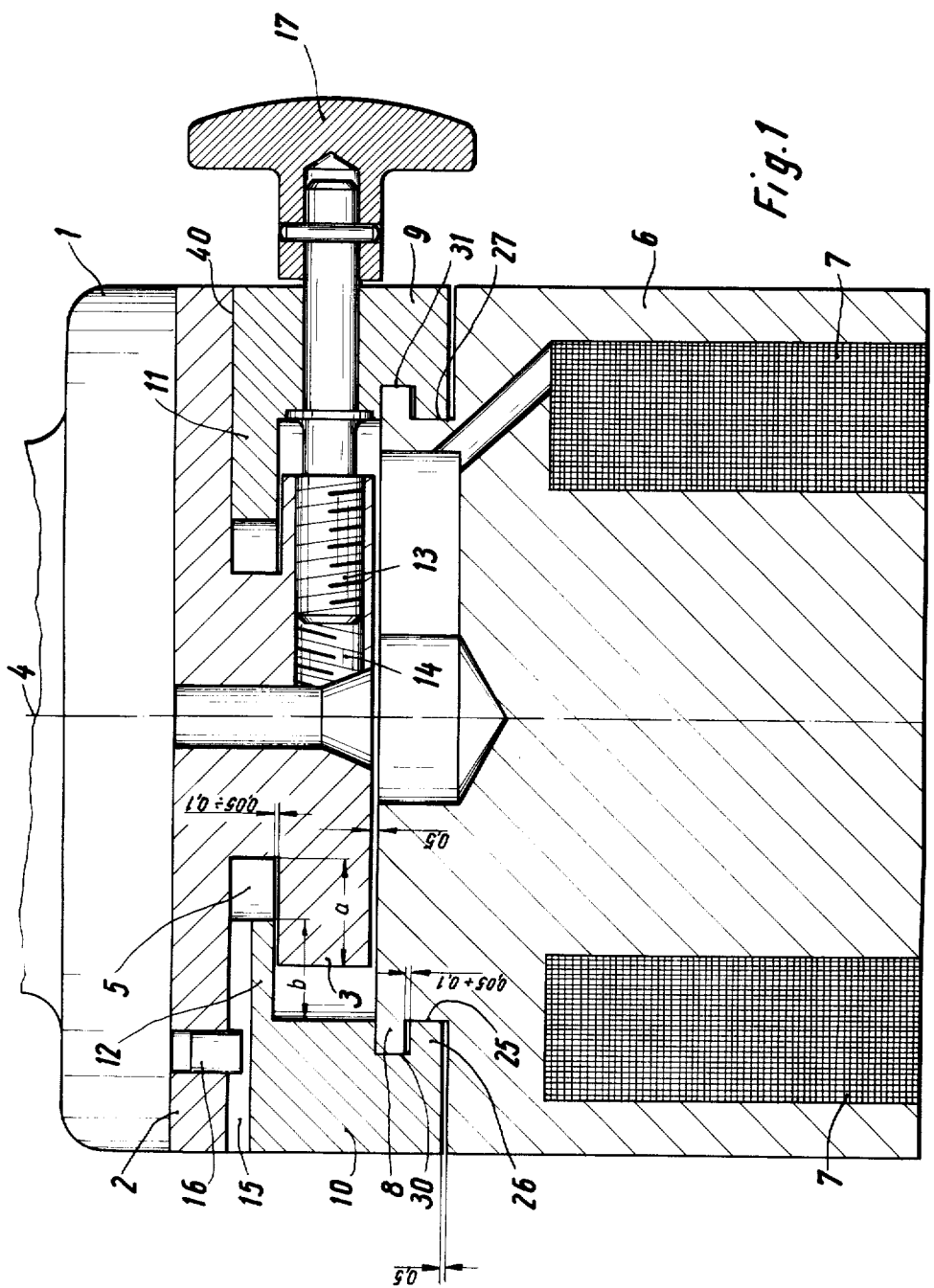

ADJUSTABLE SUPPORTING STRUCTURE FOR POWER TOOLS OR THE LIKE

BACKGROUND OF THE INVENTION

The present invention relates to an adjustable supporting structure for a power tool in which a column adapted to support the power tool, for instance a boring machine, has a base which is turnable about its axis and movable transverse to this axis and held by means of a clamping device on a foot. The clamping device comprises two clamping ring halves which are coupled with the base of the column for turning therewith and which are provided with two radially inwardly extending flanges engaging in corresponding grooves respectively formed in the base of the column and in the foot so that by tightening the clamping ring halves the base of the column is secured against the rotation with respect to the foot. A screw spindle extending radially through a bore in one of the clamping ring halves, to be turnably but axially immovably mounted therein, has an inner threaded portion self-lockingly engaged in a corresponding threaded bore of the base and a handle or grip portion extending outwardly from the clamping ring half is provided to move the column and the base thereon in transverse or radial direction with respect to the foot. The foot is provided with electromagnets so that it can be held by magnetic attraction on a magnetizable metallic body.

Adjustable supporting structures of the aforementioned kind for power tools, such as boring machines or the like, are known in the art. In one of the known constructions a single clamping lever is provided so that by turning this lever in one direction the column with its base is freely turnable and transversely movable with respect to the foot. An essential disadvantage of this known construction is that during adjustment of the column in one direction an undesired adjustment in the other direction may take place. In order to overcome this disadvantage another construction has been developed which comprises two connected clamping ring halves which, with inwardly extending flanges at their lower edge, engage in a corresponding groove in the foot and which, with corresponding flanges on the upper edge, engage a corresponding groove in the base of the column so that the latter, by tightening the clamping ring halves, may be connected against turning and against lateral movement with respect to the foot. In this known construction the two clamping ring halves form an eccentric opening and can be tightly clamped on the foot. When the clamping ring is released, the column may be turned about its axis. On the other hand, when the two halves of the clamping ring are turned together, then the column is moved due to the eccentricity of the opening through which it extends, in a direction transverse to the axis of the foot. The column and the clamp ring halves are in self-locking engagement with each other so that the column after its transverse adjustment during its turning about its longitudinal axis will not be moved in direction transverse to its axis. However, this construction has the disadvantage that, due to the eccentricity of the clamping ring halves, the transverse adjustment of the column, during turning of the clamping ring halves, will occur along a curved path so that a plurality of adjustments may be necessary in order to properly place the boring tool against a desired point of the workpiece.

In another adjustable supporting structure known in the art separate adjusting levers are provided for carrying out the turning movement of the column relative to the foot and the adjustment of the column in direction transverse to its axis. This known construction requires so many elements so that the manufacture of this construction is complicated and expensive and for this reason this last-mentioned construction has not found great acclaim in the art.

Another construction has therefore been developed in which the turning and the transverse movement of the column may be carried out independent from each other, that is that during turning of the column it is not necessary to assure that the adjustment in transverse direction carried out prior to the turning is again changed. In this known construction, disclosed in the U.S. Pat. No. 3,700,195, the two clamping ring halves are coupled with the base of the column for turning therewith and a screw spindle is arranged in one of the clamping ring halves and engages with a threaded portion in a corresponding threaded bore of the base of the column for adjusting the latter in a direction transverse to its longitudinal axis. In this construction the base of the column is connected nonturnable and immovably in transverse direction with the foot when the two clamping ring halves are tightened. From this results that an adjustment of the column in transverse direction to its axis must be carried out before clamping of the clamping ring halves. In practice it is however often desired to adjust the column after one boring operation in direction transverse to its axis without turning the column at the same time. While this is theoretically also possible with the last-mentioned construction, this requires, however, a loosening of the clamping ring halves so that an undesired turning of the column during the transverse adjustment thereof cannot be positively prevented.

SUMMARY OF THE INVENTION

It is an object of the present invention to overcome the above-described disadvantages of adjustable supporting structures for power tools or the like.

It is a further object of the present invention to provide an adjustable supporting structure of the aforementioned kind which is composed of relatively few and simple parts so that the supporting structure may be manufactured at reasonable cost and stand up properly under extended use.

It is a special object of the present invention to provide an adjustable supporting structure in which, after clamping of the clamping ring halves, the base of the supporting column is connected to the foot against rotation, while after such clamping the base of the supporting column may still be shifted in direction transverse to the axis of the column with respect to the foot.

With these and other objects in view, which will become apparent as the description proceeds, the supporting structure according to the present invention for power tools such as boring machines or the like mainly comprises a foot having electromagnetic means energizable to attract the foot to a metallic body in which the foot has a first circumferential groove and an end face. A supporting member arranged to support the power tool includes a base closely adjacent to the aforementioned end face and the base is provided with a second circumferential groove. A ring-shaped clamping device comprising a pair of arcuate sections is provided with first flanges extending into the aforementioned first groove and the second flanges extending with radial clearance into the second groove to hold the base against movement away from the foot. The sections of the ring-shaped clamping device are adapted to be moved into and out of clamping engagement with the foot, and coupling means connect the sections of the clamping device with the base for angular movement therewith. Self-locking adjusting means comprising a rotary portion provided in one of the sections of the clamping device extend substantially normal to the axis of the supporting member and a mating second section is provided in the base and arranged to move with the base sidewise in response to rotation of the rotary portion. The sections of the clamping device and the base being constructed and arranged with respect to the foot so that even after the sections are brought in clamping engagement with the foot, the base may be moved sidewise relative to the foot by turning the rotary portion of the self-locking adjustment means, whereby during such sidewise adjustment of the base undesired rotary movement of the base relative to the foot is prevented.

The arrangement is made in such a manner that an end face on the base facing the end face of the foot is still spaced through a small distance of about 0.1 to 0.8 mm from the end face of the foot in the clamped position of the sections of the clamping ring. This will assure that, even after clamping engagement of the clamping device, the base of the supporting member will not be clamped in axial direction against the foot so that even after clamping engagement of the sections of the clamping device the base of the supporting member may be easily shifted by the adjusting means in direction transverse to the longitudinal axis of the supporting member relative to the foot.

Thereby it is advantageous when each of the flanges on the sections of the clamping device which engage into the corresponding groove in the foot has a rectangular cross section. However, also other cross sections of these flanges are usable with the present invention, for instance these flanges may each have at least one outwardly inclined guide face engaging in the clamped position of the sections a corresponding guide face in the groove.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is an axial cross section through a first embodiment of a supporting structure according to the present invention;

Figure 3:
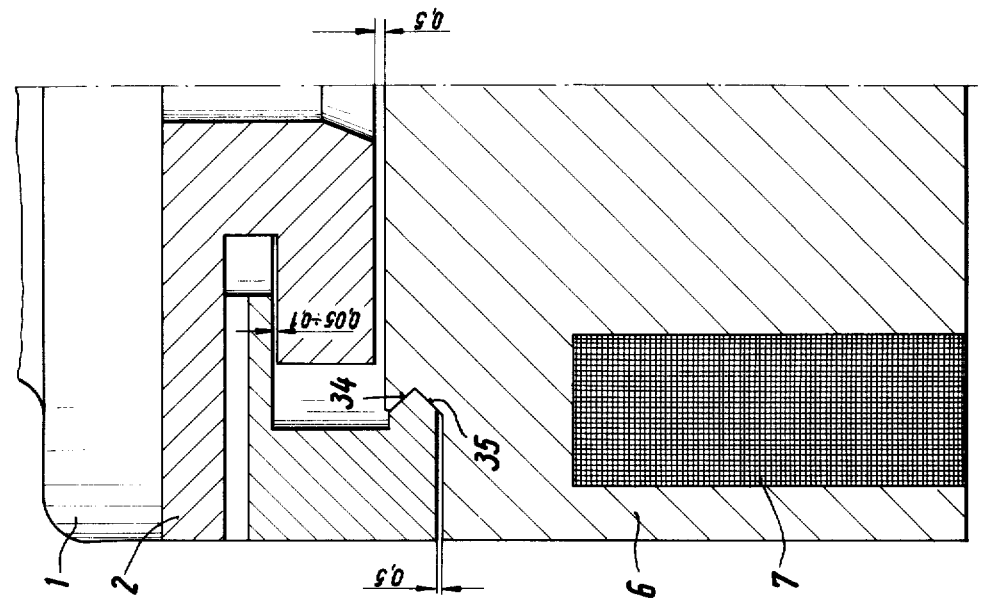
FIG. 3 partially illustrates a third embodiment in axial cross section.

DESCRIPTION OF THE PREFERRED
EMBODIMENTS

Referring now to FIG. 1, it will be seen that the adjustable supporting structure according to the present invention comprises a supporting member or column 1, only partially shown in the drawing, and adapted to carry on an upper portion thereof, not shown in the drawing, a power tool, for instance a boring machine, likewise not illustrated, preferably adjustable in vertical direction. The column 1 is provided on its lower end with a carrier or base 2 integrally formed therewith or connected thereto in any well known manner. The base 2 is provided with a cylindrical extension 3 arranged coaxially with the longitudinal axis 4 of the column. An annular groove 5 having a depth in radial direction of the dimension $a$ is formed in the extension 3. The base 2 abuts with the face 40 thereof against the upper face of a clamping device having two clamping ring halves or sections 9 and 10. A foot 6 is arranged beneath the cylindrical extension 3 of the base and this foot is provided at its upper end with an annular collar 8 against which the clamping ring sections 9 and 10 abut. The foot 6 is formed beneath the collar 8 with an annular groove 25 having, in the embodiment shown in FIG. 1, a rectangular cross section. The clamping ring sections 9 and 10 are respectively provided at their lower ends with radially inwardly extending substantially semicircular flanges 26 and 27 of rectangular cross section and engaged in the groove 25, and at their upper ends with radially inwardly extending substantially semicircular flanges 11 and 12 which are engaged in the annular groove 5 formed in the extension 3 of the base 2. As can be seen from FIG. 1, the inner peripheral surfaces of the clamping ring sections 9 and 10 are radially spaced from the outer cylindrical surface of the extension 3 and the groove 5 has a radial depth $a$, whereas the flanges 11 and 12 have a radial extension $b$ so that an annular clearance is formed between the inner ends of the flanges 11, 12 and the annular face of the groove opposite these inner ends. The foot 6 formed of magnetizable material is provided with magnet spools 7 so that the foot constitutes an electromagnet adapted to be held by magnetic attraction on a metallic body of magnetizable material abutting against the bottom face of the foot.

Self-locking adjusting means in form of a screw spindle 13 are provided for adjusting the position of the supporting member 1 and its base 2 relative to the foot 6 in direction transverse to the axis 4. The spindle 13 has a portion turnably and axially immovably mounted in a radial bore of the clamping ring section 9 and an inner threaded portion threadingly engaged in a correspondingly threaded bore in the extension 3 of the base. A handle 17 is connected to a portion of the screw spindle projecting outwardly from the ring section 9 for turning the screw spindle 13 about its axis.

The clamping ring section 10 is provided at its upper end with a radially extending guide groove 15 in which a portion of a pin-shaped follower 16 is engaged to be slidingly guided therein.

The two ring sections 9 and 10 are on adjacent ends thereof connected to each other in a known manner not forming part of the present invention by a screw and at the opposite ends by a clamping screw connected with a clamping lever. This construction, well known in the art, does not form part of the present invention and it is therefore not illustrated in the drawing, but such a construction is clearly shown in the aforementioned U.S. Pat. No. 3,700,195 to which reference may be had.

When the mentioned clamping lever is turned through a small angle in the direction of release the clamping action provided by the clamping ring sections, then the two sections 9 and 10 are slightly spread apart. Such spreading will release the radial clamping action between the foot 6 and the inner ends of the flanges 26 and 27 of the clamping ring sections 9 and 10 so that the clamping ring sections may be turned relative to the foot 6, turning thereby also the base 2, respectively the column 1 about the longitudinal axis 4 of the latter, due to the coupling connection of the base with the clamping ring section 10. After releasing of the clamping action of the clamping ring sections 9 and 10 it is evidently possible, by turning the screw spindle 13, to move the base 2 and therewith also the column 1 in a direction transverse to the axis 4. However, with the supporting structure according to the present invention it is also possible to move the base 2 with the column 1 in direction transverse to the longitudinal axis 4 of the column after the clamping sections 9 and 10 clampingly engage the foot 6 and prevent thereby a rotary movement of the column 1 about its longitudinal axis since after such clamping of the clamping sections 9 and 10 against the foot, no clamping of the base 2 in axial direction against the foot 6 will occur. This is especially due to the dimensioning of the base 2 and its extension 3. As clearly shown in FIG. 1, the height of the extension 3 in axial direction between the bottom face of the groove 5 and the end face of this extension facing the foot 6 is smaller than the distance between the bottom faces of the flanges 11 and 12 and the upper face of the foot 6 so that a clearance of about 0.5 mm will remain between the bottom face of the extension 3 and the top face of the foot 6 and a small clearance of about 0.05 to 0.1 will remain between the bottom faces of the flanges 11 and 12 and the top face of the extension 3. Therefore, with the construction of the present invention it is possible not only to turn the supporting member or column 1 independent of its adjustment transverse to the axis 4, but also to move the supporting member or column 1 transverse to its axis regardless whether the clamping ring halves 9 and 10 clampingly engage the foot 6 or not.

Figure 2:
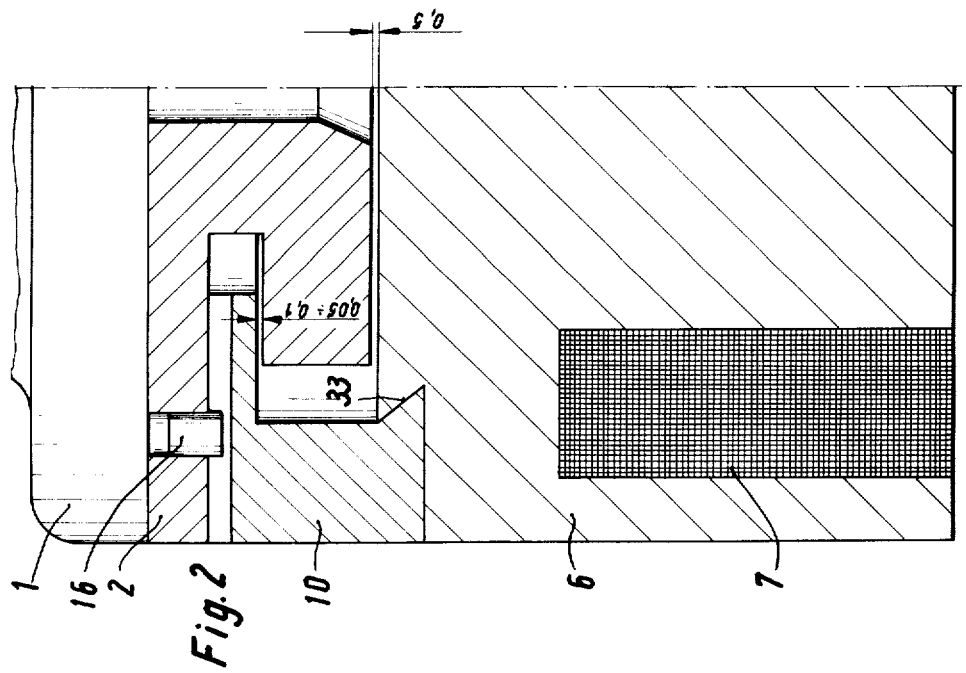
FIG. 2 partially illustrates a second embodiment of the present invention in axial cross section.

FIGS. 2 and 3 partially illustrate slight modifications of the above-described construction, which differ from the construction shown in FIG. 1 in that instead of a groove 25 of substantially rectangular cross section in the foot 6, substantially dovetailed grooves are shown in the upper portion of the foot 6. In FIG. 2 the flanges on the lower end of the clamping ring halves 9 and 10, of which only the flange 10 is shown in FIG. 2, have outwardly and upwardly inclined guide faces 33, whereas the modification of FIG. 3 two guide faces 34 and 35 extending substantially normal to each other are provided on each of the flanges at the lower end of the clamping ring halves. Evidently, the guide faces 34 and 35 could also include an angle different from 90°.

In the constructions as shown in FIGS. 2 and 3 care has to be taken that during clamping engagement of the clamping ring halves 10 and 11 the base 2 will not be axially pressed against the top face of the foot 6, but that in the fully clamped position of the clamping ring halves, the aforementioned clearances will still be maintained as clearly shown in FIGS. 2 and 3.

It will be understood that each of the elements described above, or two or more together, may also find a useful application in other types of adjustable supporting structure for power tools differing from the types described above.

While the invention has been illustrated and described as embodied in an adjustable supporting structure for a power tool permitting especially adjustment of a supporting member of the supporting structure in direction transverse to its axis after angular adjustment of this supporting member about its axis, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without emitting features that, from the standpoint of prior art, fairly constitute essential characteristics of the generic or specific aspects of this invention.

What is claimed as new and desired to be protected by Letters Patent is set forth in the appended claims:

1. A supporting structure for power tools, such as boring machines or the like, comprising a foot having means to secure said foot to a body, said foot having a first circumferential groove and an endface; a supporting member arranged to support a boring machine or the like and including a base closely adjacent said endface and having a second circumferential groove; a ring-shaped clamping device comprising a pair of arcuate sections provided with first flanges extending into said first groove and with second flanges extending with radial clearance into said second groove to hold said base against movement away from said foot, said sections of said ring-shaped clamping device being adapted to be moved into and out of clamping engagement with said foot; coupling means connecting said sections with said base for angular movement therewith; and self-locking adjustment means comprising a rotary portion provided on one of said sections and extending substantially normal to the axis of said supporting member and a mating section provided in said base and arranged to move with said base sidewise in response to rotation of said rotary portion, said sections, said base and said foot being arranged and constructed so that even after said sections are brought in clamping engagement with said foot, said base may be moved sidewise relative to said foot by turning said rotary portion of said self-locking adjustment means, whereby during such sidewise adjustment of said base undesired rotary movement of said base relative to said foot is prevented.

2. A supporting structure as defined in claim 1, wherein said base has an end face facing said end face of said foot, and wherein the clamped position of said sections, said end faces are spaced through a small distance from each other.

3. A supporting structure as defined in claim 2, wherein said spacing of said endfaces in the clamped positions of said sections is about 0.1–0.8 mm.

4. A supporting structure as defined in claim 2, wherein the height of the base portion between said end faces thereof and said second groove is smaller than the distance between said endface of said foot and the surface of said second flange facing said endface of said foot.

5. A supporting structure as defined in claim 1, wherein said first and second annular grooves, as well as flanges located therein are of rectangular cross section, and wherein each of said flanges has in direction of the axis of the supporting member a dimension slightly smaller than the corresponding dimension of the groove.

6. A supporting structure as defined in claim 1, wherein said first flange has a least one outwardly inclined guide face engaging in the clamped position of said section a corresponding guide face in said first groove.

7. A supporting structure as defined in claim 1, wherein said first groove is defined by two annular faces including an angle of substantially 90° with each other, and wherein said first flange has correspondingly inclined faces in the clamped position of said section said annular faces of said first groove.

8. A supporting structure as defined in claim 1, wherein said coupling means comprises a radial groove in said second flange and a pin-shaped follower fixed to said base and extending with an end portion thereof in said radial groove.

9. A supporting structure as defined in claim 1, wherein said self-locking adjusting means comprises a screw spindle having a portion turnably and axially immovably mounted in one of said sections, a threaded portion engaged in a threaded bore of said base, and a handle portion projecting outwardly from said section.

10. A supporting structure as defined in claim 1, wherein said means to secure said foot to a body comprise electromagnetic means energizable to hold said foot by magnetic force on a body of magnetizable material.

* * * * *